United States Patent [19]

Daughton

[11] Patent Number: 4,547,330

[45] Date of Patent: Oct. 15, 1985

[54] METHOD OF PREPARING AN ORIFICE PLATE FOR AN INK JET PRINTER

[75] Inventor: William J. Daughton, Colorado Springs, Colo.

[73] Assignee: The Mead Corporation, Dayton, Ohio

[21] Appl. No.: 573,740

[22] Filed: Jan. 25, 1984

[51] Int. Cl.[4] .............................................. B29H 9/00
[52] U.S. Cl. ................................ 264/261; 264/271.1; 264/275; 264/277
[58] Field of Search ...................... 249/96, 97, 91; 264/229, 261, 271.1, 272.15, 275, 277; 425/123

[56] References Cited

U.S. PATENT DOCUMENTS

| | | | |
|---|---|---|---|
| 2,577,584 | 12/1951 | Hofreiter | 264/277 |
| 2,996,419 | 8/1961 | Schmick. | |
| 3,156,950 | 11/1964 | Walton, Jr.. | |
| 3,294,504 | 12/1966 | Hicks, Jr.. | |
| 3,737,367 | 6/1973 | Roberts et al.. | |
| 3,754,882 | 8/1973 | Van Esdonk et al.. | |
| 4,166,564 | 9/1979 | Wolber. | |

OTHER PUBLICATIONS

Humenik, Seal Glass for Ink Jet Nozzle Arrays vol. 20, No. 9, 2/78.

*Primary Examiner*—Donald Czaja
*Assistant Examiner*—V. Fischbach
*Attorney, Agent, or Firm*—Biebel, French & Nauman

[57] ABSTRACT

A method is disclosed for preparing orifice plates for ink jet printing apparatus from a set of orificed cylindrical jewels having substantially identical fluid flow rates therethrough. Several pairs of closely spaced thin wires are mounted transversely across a mold cavity. Each pair of wires is tensioned to support a cylindrical jewel without deflection. Two backing plates then are placed on the mold to position the jewels in precise alignment. The mold then is filled with a liquid resin to cover the jewels. The resin then is cured to a solid state. The cured structure is removed from the mold and the protruding wires are trimmed to form the finished orifice plate.

2 Claims, 5 Drawing Figures

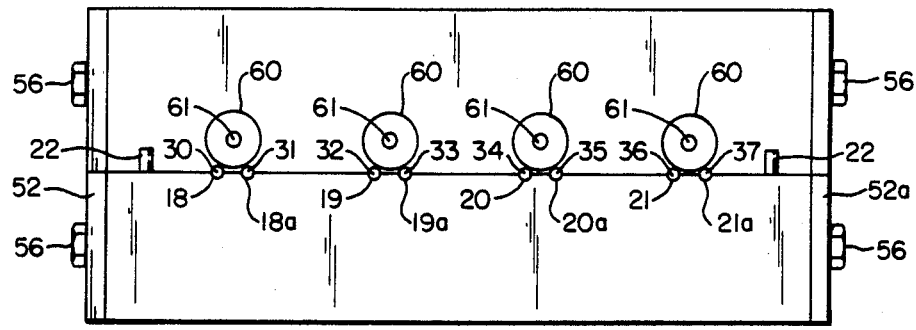
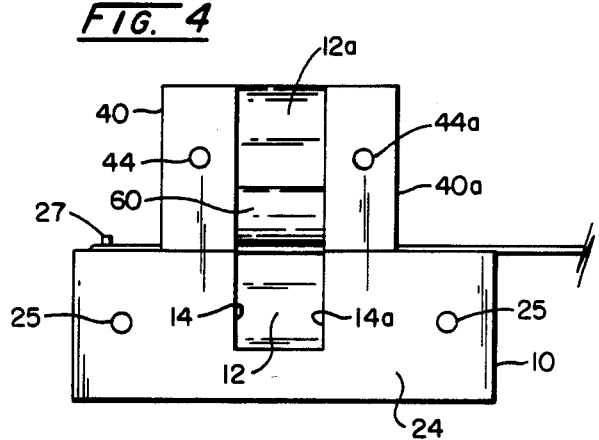
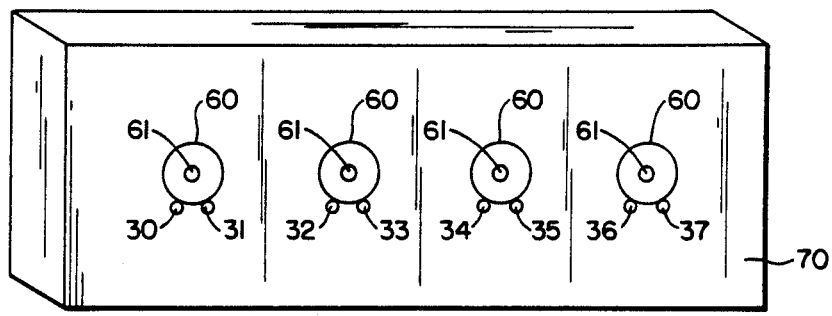

METHOD OF PREPARING AN ORIFICE PLATE FOR AN INK JET PRINTER

BACKGROUND OF THE INVENTION

Ink jet printing apparatus produce a plurality of uniform drops aligned parallel to one another and perpendicular to the movement of paper or other material upon which printing is to be effected. The printing is produced by using a reservoir of printing fluid (herein referred to as ink, but which can have varying compositions as is well known in the art) with a plurality of parallel aligned orifices at the bottom of the reservoir through which the fluid is ejected or permitted to flow at a predetermined rate and in such a manner as to produce drops of fluid at the ends of the filaments of the ink which pass through the orifices. These drops are then selectively charged or not charged as they pass through holes in a charge plate and are subsequently caught in a catcher or deposited on the material which is being printed.

A popular type of ink jet printing apparatus employs a relatively thick and rigid orifice plate. A vibrating plate positioned above the liquid reservoir creates a uniform pressure on the printing fluid and forces it through the orifice plate. Such apparatus is disclosed in U.S. Pat. No. 3,900,162.

The design specifications for such orifice plates are demanding and difficult to meet. Specifically, to provide acceptable quality printing, the orifices must be aligned in a rigorously straight line with the centers of the orifices being spaced equidistant from each other. In addition, the rate of fluid flow through each orifice must be essentially the same.

Economical methods of forming the orifices in the orifice plate are difficult to find since the nature of the system requires the use of extremely small diameter holes in these plates. For example, the orifices in the orifice plate are generally in the range of 0.0005–0.0015 inch in diameter. In the past, this has required very expensive, time consuming and exotic methods of manufacturing orifice plates having uniform diameter orifices.

One method for preparing such orifice plates involves first encapsulating a plurality of parallel glass capillaries in a block of epoxy resin, solder glass, or the like. Plates of the desired thickness then are made by making orthogonal cuts across the axes of the capillaries. Such a method is disclosed in the Cone patent U.S. Pat. No. 4,112,436. In preparing orifice plates from glass capillaries, it is difficult to obtain a reliable supply of capillaries having orifices of uniform diameter throughout their length. As a consequence, a significant percentage of the orifice plates do not have sufficiently uniform fluid flow rates through each orifice to be acceptable for use.

Accordingly, there is a need in the art for an improved and economical method for preparing orifice plates whose orifices provide very uniform fluid flow rates.

SUMMARY OF THE INVENTION

Ink jet orifice plates are prepared from a plurality of orificed cylindrical jewels of identical size which have substantially identical fluid flow rates therethrough. Such orificed cylincrical jewels are commercially available. The fluid flow rates through the individual jewels can be tested, and all jewels selected to be included in a single orifice plate will have substantially identical fluid flow rates therethrough.

The manufacturing method involves mounting several pairs of closely spaced thin wires transversely across a cavity in a liquid-tight mold. The pairs of wires are positioned in parallel alignment with the midpoints of the pairs being equidistant from each other. The pairs of wires are tensioned so that they each will support a cylindrical jewel without deflection. A first backing plate is positioned on the mold transversely to the pairs of wires. An orificed cylindrical jewel is positioned on each of the pairs of wires so that one of its faces is in touching contact with the first backing plate. A second backing plate is placed on the mold transversely to the pairs of wires so that it is in touching contact with the second face of each of the cylindrical jewels. The mold then is filled with a liquid resin to completely cover the pairs of wires and cylindrical jewels. The liquid resin then is cured to a solid state. The cured structure is removed from the mold and the protruding wires are trimmed to form the finished orifice plate.

BRIEF DESCRIPTION OF THE DRAWINGS

FIG. 3 is a side elevation of the apparatus of FIG. 1 with end plates attached and other parts removed.

FIG. 4 is an end elevation of the apparatus of FIG. 1.

FIG. 5 is a perspective view of an orifice plate made by the method of the invention.

DETAILED DESCRIPTION OF THE INVENTION

Figure 1:
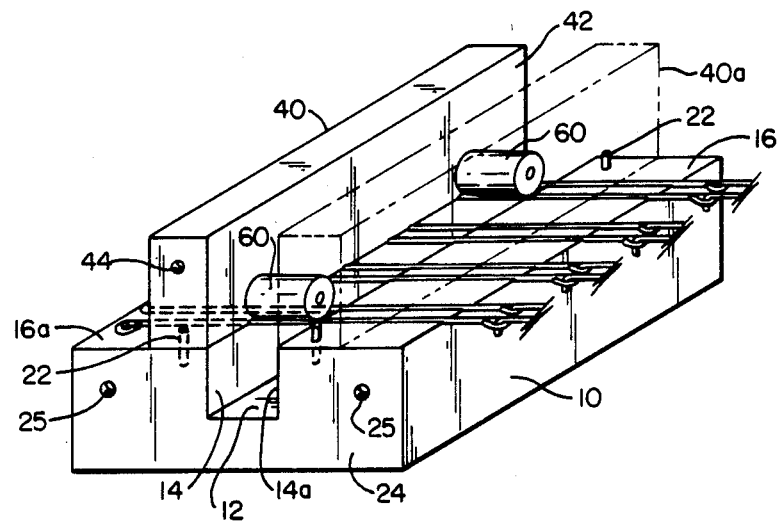
FIG. 1 is a perspective view of apparatus (with certain parts removed) that can be employed to carry out the method of the invention.

Referring to the drawings, the apparatus for preparing the orifice plates includes an elongated, rectangularly shaped mold body 10 having a cavity 12 cut therein. Cavity 12 runs throughout the mold body along its major axis and includes parallel, vertically aligned walls 14 and 14a. The top faces 16 and 16a of the mold body have pairs of shallow hemispherical grooves 18, 18a; 19, 19a; 20, 20a; and 21, 21a cut therein transverse to the mold body's principal axis to receive and position parallel pairs of wires 30, 31; 32,33; 34, 35; and 35,37. These grooves are cut so that the midpoints of each wire pair are equidistant from each other. The faces 16 and 16a also are provided with projecting dowel-like elements 22. The end faces 24 of the mold body each include a pair of threaded taps 25. The purpose and function of elements 22 and taps 25 are described subsequently. The face 16a includes a series of restraining pins 27 whose function also are described subsequently.

A first rectangularly shaped backing plate 40 is provided to be seated on face 16a of the mold body. The bottom face of backing plate 40 includes a plurality of unseen circularly shaped taps which receive the dowel-like elements 22 provided in face 16a. The elements 22 and the unseen taps position the plate 40 so that its interior face 42 is aligned with and juxtapositioned with face 14 of the mold body. The bottom face of backing plate 40 is machined to seat snugly on face 16a of the mold body and has unseen shallow hemispherical grooves cut therein which are transverse to the mold body's principal axis, and are complementary to and juxtapositioned with the like hemispherical grooves cut into the face 16a. A threaded tap 44 is provided in both end faces of the backing plate. A second and complementary backing plate 40a, shown by shadow lines in FIG. 1, is provided and is identical to plate 40 in construction.

Figure 2:
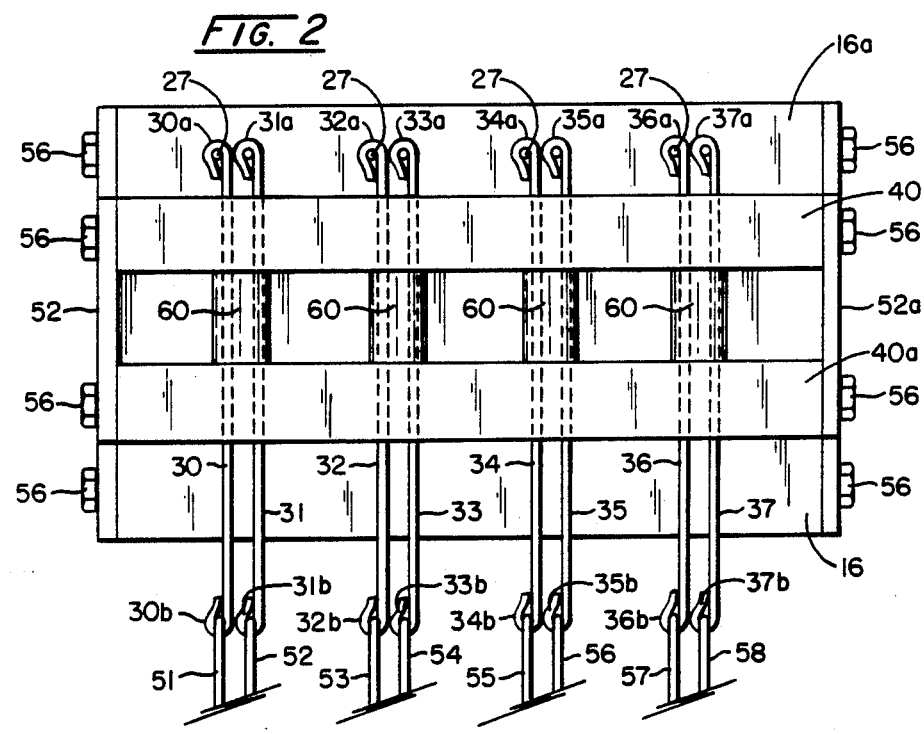
FIG. 2 is a top plan view of the apparatus of FIG. 1 with end plates attached thereto.

A pair of complementary end plates 52 and 52a, seen in FIGS. 2 and 3, are provided for attachment to the mold body 10 and backing plates 40 and 40a. The faces of the end plates are cut to be coextensive with and to overlap the ends of the mold body and the backing plates, and are attached thereto by bolts 56 which extend into the threaded taps 25, 55 and 44a previously described. The end plates have machined interior faces which fit snugly against the end faces of the mold body and the backing plates. The height of the end plates extends upwardly to the top faces of backing plates 40 and 40a. The end plates and the backing plates define a vertical extension of cavity 12 (shown in FIG. 1), which extension is designated as 12a in FIG. 4. By reason of the machined interior surfaces of the mold body's top faces 16 and 16a, the interior surfaces of backing plates 40 and 40a, and the interior surfaces of end plates 52 and 54, the mold cavities 12 and 12a are liquid-tight.

To prepare orifice plates, support wires 30, 31, 32, 33, 34, 35, 36, and 37 are strung transversely across the faces 16 and 16a of mold body 10 and are seated in the shallow hemispherical grooves 18, 18a, 19, 19a, 20, 20a, 20, and 21a (shown in FIG. 3). First loops 30a, 31a, 32a, 33a, 34a, 35a, 36a, and 37a provided in the support wires are looped over the restraining pins 27 provided in the mold face 16a. Wires 51, 52, 53, 54, 55, 56, 57, and 58, each having a hooked end, are attached to second loops 30b, 31b, 32b, 33b, 34b, 35b, 36b, and 37b provided in support wires 30, 31, 32, 33, 34, 35, 36, and 37. Tension is placed on each of wires 51, 52, 53, 54, 55, 56, 57, and 58, by means not shown, so that the support wires are drawn sufficiently taut so that each wire pair, 30, 31; 32, 33; 34, 35; and 36, 37 will support a cylindrical jewel 60 without deflection.

The first backing plate 40 then is positioned on face 16a of the mold body 10 by means of the dowel-like elements 22 of face 16a which fit into the aligned circularly shaped taps provided in the bottom face of the backing plate. A single cylindrical jewel 60 then is set on each of the wire pairs (only two jewels are shown in FIG. 1) with its orifice aligned with its supporting wires and its one face butting against backing plate 40. The cylindrical jewels employed will be selected carefully so that they will have identical dimensions and essentially identical fluid flow rates through their orifices. The second backing plate 40a then is positioned on face 16 of the mold body 10 in the same manner as previously described for backing plate 40. The interior face of backing plate 40a butts against the second face of jewels 60 to hold them firmly in their desired positions. The complementary end plates 52 and 52a then are attached by bolts 56 to the assembly of the mold body 10 and the backing plates 40 and 40a.

In the next step of the process, a liquid resin such as a curable epoxy resin is poured into the mold to completely fill cavities 12 and 12a. The resin then is cured to a solid state. After the end plates 52 and 52a and backing plates 40 and 40a are removed, the solid molding is lifted vertically from the cavity 12 of mold body 10. The ends of the wires 30, 31, 32, 33, 34, 35, 36, and 37 projecting from the molding are trimmed and, if needed or desired, the faces of the molding are polished to provide the finished orifice plate 70 shown in FIG. 5. By reason of the process of manufacture, the orifices 61 are precisely aligned, are equidistantly spaced from each other, and have substantially identical fluid flow rates threrethrough.

The mold body, the backing plates, and the end plates can be fabricated from diverse types of materials of construction. The type material employed will be dictated in part by the resin employed to prepare the main body of the orifice plate. When a preferred epoxy resin is employed, it is essential that the mold body, the backing plates, and the end plates be fabricated from a material which does not form bonds with the epoxy resin. Polyolefin resins such as polypropylene and high density polyethylene are preferred for this purpose. In some cases, the interior surfaces of the mold cavity can be provided with a non-stick coating such as a poly (tetrafluoroethylene) resin.

Orificed cylindrical jewels suitable for use in the practice of the invention are available from commercial sources.

While the processes and apparatus herein described constitute preferred embodiments of the invention, it is to be understood that the invention is not limited to these precise processes and apparatus, and that changes may be made therein without departing from the scope of the invention which is defined in the appended claims.

What is claimed is:

1. A method for preparing an orifice plate for ink jet printing apparatus which comprises:
    (a) mounting pairs of closely spaced thin wires transversely across a cavity of square or rectangular cross-section in a mold;
    (b) positioning said pairs of wires in parallel alignment with the midpoints of said pairs being equidistant from each other;
    (c) tensioning said pairs of wires so that they will support a cylindrical jewel without deflection;
    (d) positioning a first backing rectangularly shaped plate on said mold transversely to said pairs of wires;
    (e) positioning on orificed cylindrical jewel on each of said pairs of wires so that one of its faces is in touching contact with said first backing plate;
    (f) positioning a second rectangularly shaped backing plate on said mold transversely to said pairs of wires so that it is in touching contact with the second face of each of said cylindrical jewels;
    (g) filling said mold with a liquid resin to completely cover said pairs of wires and cylindrical jewels;
    (h) curing said liquid resin to a solid state; and
    (i) removing the cured molding from said mold;
    said orificed cylindrical jewels being of equal length and having substantially equal fluid flow rates therethrough.

2. A process of claim 1 in which the liquid resin employed in step (g) is a curable epoxy resin.

* * * * *